(12) United States Patent
Velicky

(10) Patent No.: US 9,752,287 B2
(45) Date of Patent: Sep. 5, 2017

(54) METHOD AND APPARATUS FOR FORMING AND APPLYING RETROREFLECTIVE PAVEMENT MARKINGS

(71) Applicant: New York State Thruway Authority, Albany, NY (US)

(72) Inventor: Steven Velicky, Amsterdam, NY (US)

(73) Assignee: New York State Thruway Authority, Albany, NY (US)

( * ) Notice: Subject to any disclaimer, the term of this patent is extended or adjusted under 35 U.S.C. 154(b) by 129 days.

(21) Appl. No.: 14/247,423

(22) Filed: Apr. 8, 2014

(65) Prior Publication Data

US 2014/0219722 A1 Aug. 7, 2014

Related U.S. Application Data

(62) Division of application No. 13/156,397, filed on Jun. 9, 2011, now Pat. No. 8,740,498.

(51) Int. Cl.
*E01C 11/00* (2006.01)
*E01F 9/576* (2016.01)
(Continued)

(52) U.S. Cl.
CPC .............. *E01C 11/00* (2013.01); *E01C 23/00* (2013.01); *E01C 23/166* (2013.01); *E01C 23/22* (2013.01);
(Continued)

(58) Field of Classification Search
CPC ...... E01C 23/16; E01C 23/166; E01C 23/185; E01C 23/22; E01C 23/222; E01C 23/225;
(Continued)

(56) References Cited

U.S. PATENT DOCUMENTS 4,856,931 A   8/1989  Bollag
5,774,265 A * 6/1998  Mathers ................. G02B 5/128
                                                        359/539

(Continued)

FOREIGN PATENT DOCUMENTS

KR   10-0297383 B1   9/2001
WO   2010-036522 A1  4/2010

OTHER PUBLICATIONS

Manual on Uniform Traffic Control Devices for Street and Highways 2009 Edition, US Department of Transportation, Federal Highway Administration.

*Primary Examiner* — Kimberly N Kakalec
(74) *Attorney, Agent, or Firm* — Harris Beach PLLC; Neal L. Slifkin

(57) ABSTRACT

A method for forming and applying retroreflective pavement markings comprising the steps of a) spraying the area with a hot epoxy binder, b) depositing particles of a microcrystalline ceramic element having a high refractive index onto the fresh epoxy binder, c) depositing relatively large spherical glass beads onto the fresh epoxy binder, and d) depositing relatively small spherical glass beads onto the fresh epoxy binder. The small beads provide high reflectivity in daytime and at night on dry pavement. The large beads provide superior reflectivity at night on damp pavement. The ceramic element particles provide high reflectivity when wet and during heavy rain. Where the pavement is subject to snowplowing, the marking may be inlaid in a recessed area in the pavement, the recess being about 100 mils deep, and the wet epoxy layer being about 20 mils thick.

7 Claims, 1 Drawing Sheet

(51) Int. Cl.
  *E01F 9/506* (2016.01)
  *E01C 23/00* (2006.01)
  *E01C 23/16* (2006.01)
  *E01C 23/22* (2006.01)
  *G02B 5/128* (2006.01)

(52) U.S. Cl.
  CPC ............ *E01F 9/506* (2016.02); *E01F 9/576* (2016.02); *G02B 5/128* (2013.01); *E01C 2301/00* (2013.01)

(58) Field of Classification Search
  CPC ...... E01C 23/227; E01C 23/24; E01C 23/243; E01C 23/246; E01C 7/085; E01C 1/007; E01C 5/226; E01C 9/007; E01C 9/047; E01C 11/24; E01C 11/005; E01C 19/48; E01C 23/065; E01C 23/09; E01C 19/18; E01C 19/182; E01C 19/185; E01C 19/187; E01C 19/20; E01C 19/2025; E01C 19/203; E01C 19/2035; E01C 19/204; E01C 19/2045; E01C 19/205; E01C 19/21; E01C 19/405; E01C 19/45; E01C 19/46; E01C 19/47; E01C 19/475; E01C 19/4813; E01C 2019/206; E01F 9/08; E01F 9/081; E01F 9/087; E01F 9/085; E01F 9/093; E01F 9/06; E01F 9/065; E01F 9/083; E01F 9/015; E01F 9/041; E01F 9/042; E01F 9/044; G02B 5/12; G02B 5/126; G02B 5/128; G02B 5/124; G02B 5/136
  USPC ....... 404/19, 101; 427/137, 163.4, 196, 202, 427/203; 359/536, 540, 547, 551, 552
  See application file for complete search history.

(56) References Cited

U.S. PATENT DOCUMENTS

| | | | |
|---|---|---|---|
| 5,897,914 A | 4/1999 | Depriest | |
| 6,326,053 B1* | 12/2001 | Stump | E01F 9/578 156/279 |
| 6,479,132 B2 | 11/2002 | Hedblom et al. | |
| 6,511,259 B1* | 1/2003 | Khieu | E01C 23/166 239/455 |
| 2005/0089372 A1* | 4/2005 | Wiley | E01C 19/43 404/75 |
| 2010/0272962 A1 | 10/2010 | Davies | |

\* cited by examiner

METHOD AND APPARATUS FOR FORMING AND APPLYING RETROREFLECTIVE PAVEMENT MARKINGS

CROSS-REFERENCE

This application is a divisional application of pending U.S. application Ser. No. 13/156,397, filed Jun. 9, 2011.

FIELD OF THE INVENTION

The present invention relates to systems for forming and applying reflective markings on roadways; more particularly to marking systems comprising glass beads; and most particularly to an improved pavement marking system and apparatus wherein epoxy resin, reflective ceramic elements, and glass beads of at least two different sieve sizes are deposited in a pavement area preferably recessed below the surface to protect the markings from damage by traffic and snowplows.

BACKGROUND OF THE INVENTION

The Manual on Uniform Traffic Control Devices (MUTCD) is a document issued by the Federal Highway Administration (FHWA) of the United States Department of Transportation (USDOT) to specify the standards by which traffic signs, road surface markings, and signals are designed, installed, and used. These specifications include the shapes, colors, and fonts used in road markings and signs. In the United States, all traffic control devices must generally conform to these standards. The manual is used by state and local agencies as well as private construction firms to ensure that the traffic control devices they use conform to the national standard. While some state agencies have developed their own sets of standards, including their own MUTCDs, these must substantially conform to the federal MUTCD.

The Congress of the United States has acknowledged the importance of nighttime visibility of road signs and markings as important safety tools. The 1993 DOT Appropriations Act stated that the "Secretary of Transportation shall revise the MUTCD to include a standard for a minimum level of retroreflectivity that must be maintained for traffic signs and pavement markings which apply to all roads open to public travel."

Table I shows the present federal MUTCD standard for pavement marking retroreflectivity:

TABLE I

| Minimum Maintained Retroreflectivity Levels[1] for Longitudinal Pavement Markings (2010) | | | |
|---|---|---|---|
| | Posted Speed (mph) | | |
| | ≤30 | 35-50 | ≥55 |
| Two-lane roads with centerline markings only | n/a | 100 | 250 |
| All other roads | n/a | 50 | 100 |

Measured at standard 30-m geometry in units of mcd/m²/lux, where mcd is the intensity of the light source, m2 is the square of the distance in meters between the light source and the reflector, and lux is the illumination falling on a unit area.

It is known in the art of pavement marking to apply a retroreflective marking by a method comprising the steps of a) spraying the area with a hot epoxy binder, b) depositing a particulate ceramic retroreflective element onto the fresh epoxy binder, and c) depositing spherical glass beads of a specified sieve size distribution onto the fresh epoxy binder. The beads and ceramic elements are intended to function as mirrors, reflecting light from vehicle headlights back to the light source vehicle.

It is further known to apply such a marking to an area of pavement that has been ground to a level significantly below the normal pavement surface, to protect the marking from traffic wear and abuse by snowplow blades. The pavement typically may be asphalt, concrete, or other material used as a highway wearing surface, and the marking may be, for example, a roadway center stripe, edge stripe, intermittent lane divider, arrow, alphanumeric, indicia, or any other pavement marking permitted by the Federal MUTCD.

A new application of such a prior art marking, under dry weather conditions, can yield a measured retroreflectivity of about 320. The average value over three years of use can be about 160, with a minimum value of about 50 mcd.

A significant shortcoming of such a prior art marking is that there may be almost no retroreflectance at night when the pavement is wet.

An additional complication is that a driver's need for light is known to approximately double every 13 years, e.g., at age 85 a driver needs 8 times as much light as at age 46. Further, 12% of the country's drivers are over the age of 65.

What is needed in the art is an improved system for pavement marking wherein the retroreflectivity is increased over that provided by prior art marking systems and also under all weather, illumination, and pavement conditions.

BRIEF DESCRIPTION OF THE INVENTION

Briefly described, a four-step method of forming and applying retroreflective pavement markings in accordance with the present invention comprises the steps of a) spraying the marking area with a hot epoxy binder, b) depositing particles of a microcrystalline ceramic element having a high refractive index onto the fresh epoxy binder, c) depositing relatively coarse sieve-size spherical glass beads onto the fresh epoxy binder, and d) depositing relatively fine sieve-size spherical glass beads onto the fresh epoxy binder. It has been found that the resulting pavement marking is highly effective under a wide variety of conditions. The fine sieve-size beads provide high reflectivity in daytime and at night on dry pavement, and protect the fresh paint against tracking, as in the prior art. The coarse sieve-size beads provide superior reflectivity at night on wet pavement and also protect the ceramic particles from vehicle damage, an improvement over the prior art. The high refractive index ceramic particles provide high reflectivity when wet and during heavy rain, an improvement over the prior art.

The method of dropping in succession the ceramic particles, the coarse sieve-size beads, and the fine sieve-size beads is referred to herein as a "triple drop" method, and the system for such application is referred to herein as a "triple drop" system.

In a presently preferred embodiment of the invention, especially in climates wherein the pavement is subject to snowplowing, the marking is inlaid in a recessed area in the pavement. Preferably, the recess is about 100 mils deep, and the wet epoxy layer is about 20 mils thick, allowing for one or more renewal applications, for example at three year intervals, before the recess must be re-established in the previous cut recess area over the previously placed materials.

The timing of the spraying and three dropping steps can be an important variable in obtaining the optimal depth of immersion of each ceramic particle and bead into the epoxy layer. In the present invention, an application speed of about 6 miles per hour and a spacing of about 8 inches between the binder media spray header and the first distributor of reflective media, about 10 inches between the first reflective media distributor and the second reflective media distributor, and about 8 inches between the second reflective media distributor and the third reflective media distributor provides a retroreflective marking exhibiting excellent low-angle reflectivity.

A new application of the improved marking, under dry weather conditions, can yield an initial measured retroreflectivity of about 500 cd/lx/m². The average value over three years of use can be about 350, with a minimum value of about 200. The product also provides and excellent wet night retroreflectivity that is not provided by prior art markings.

DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

Figure 1:
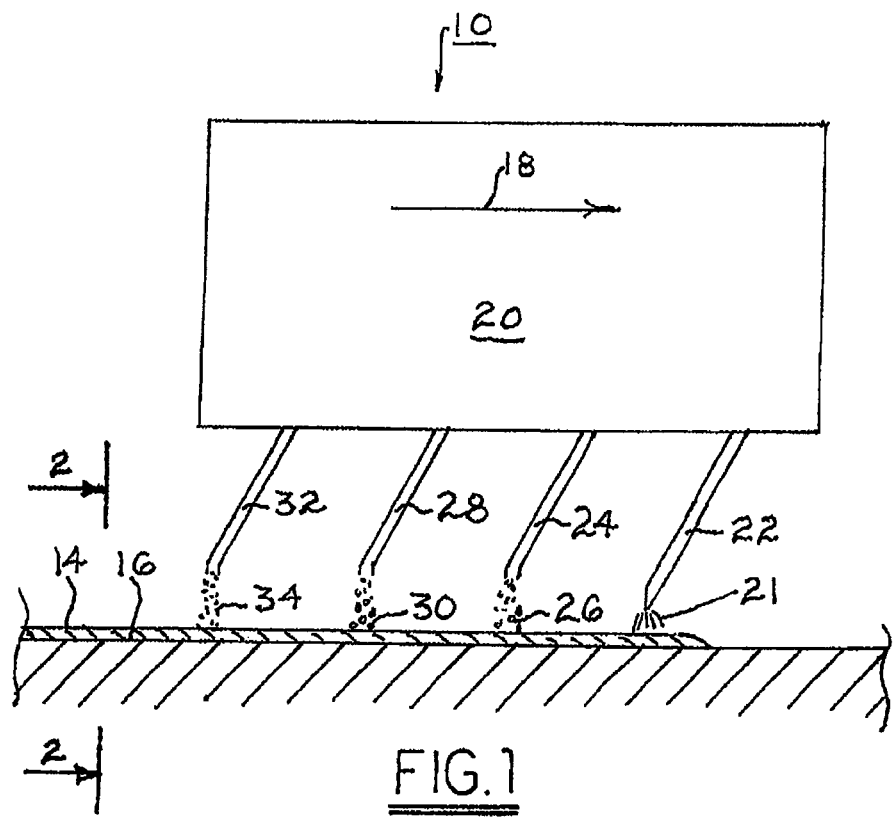
FIG. 1 is an elevational schematic drawing of a striping apparatus in accordance with the present invention.

Referring to FIG. 1, there is shown a schematic drawing of an apparatus 10 for performing a method of applying an improved pavement marking 14 to a pavement 16 in accordance with the present invention in a direction 18. For discussion below, the exemplary pavement marking is a continuous stripe such as is commonly used for marking the centerlines and edgelines of pavements, as well as the intermittent lane dividers. It will be understood that the conditions set forth for striping may be easily modified within the scope of the present invention by one of ordinary skill in the art in the application of the invention to discontinuous markings such as alphanumeric or other indicia (lane turning arrows, bicycle symbols, crosswalks, and the like).

Apparatus 10 comprises a portable sprayer and bead drop assembly 20 that may be mounted for operation on a vehicle (not shown) such as a striping truck carrying separate reservoirs of the epoxy resin components, large beads, and small beads, as well as conventional auxiliary equipment such as air compressors and controllers (not shown). The epoxy resin components may be those well-known in the art of pavement marking and need not be further described herein.

The heated and mixed epoxy resin 21 is applied to pavement 16 via a conventional spray header 22 disposed above the surface to be coated. Following in line are a first distributor 24 for depositing the high reflectivity ceramic particles 26; a second distributor 28 for depositing the coarse sieve-size beads 30; and a third distributor 32 for depositing the fine sieve-size beads 34. The ceramic particles 26, coarse sieve-size beads 30, and fine sieve-size beads 34 partially sink into the fresh epoxy and become secured thereto but protrude thereabove when the epoxy cures.

As used herein the terms "coarse sieve-size" and "fine sieve-size" apply to beads having generally about the following standard sieve-size distributions:

| Sieve Size | Percent Passing | |
| --- | --- | --- |
|  | Coarse | Fine |
| 10 | 100 | 100 |
| 12 | 95-100 | 100 |
| 14 | 80-95 | 100 |
| 16 | 10-40 | 100 |
| 18 | 0-5 | 100 |
| 20 | 0-2 | 100 |
| 30 | 0 | 80-95 |
| 50 | 0 | 9-42 |
| 80 | 0 | 0-10 |

It has been found that for continuous application apparatus 10 is optimally translated along the surface of pavement 16 at about 6 miles per hour, which governs the optimal spacings among the spray header and the various distributors. Preferably, first distributor 24 is about 8 inches from spray header 22; second distributor 28 is about 10 inches from first distributor 24; and third distributor 32 is about 8 inches from second distributor 28. This spacing allows optimal time for the particles and beads to partially sink and adhere. Preferably, spray header 22 is nearer to pavement 16 than any of distributors 24, 28, 32.

Preferably, particles 26 are dropped by gravity at a rate of at least about 5 pounds per gallon of epoxy and preferably about 7 pounds per gallon of epoxy; coarse sieve-size beads 30 at a rate of at least 5 pounds per gallon of epoxy and preferably about 7 pounds per gallon of epoxy; and fine sieve-size beads 34 at a rate of at least about 8 pounds per gallon of epoxy and preferably about 10 pounds per gallon of epoxy.

Pavement is normally marked in either white or yellow. In either case, the color of the ceramic particles must be the same as the color of the epoxy resin. For pavements such as interstate highways requiring both a yellow left side stripe and a white intermittent lane divider stripe, truck may conveniently be fitted with two independent striping apparati 12 spaced apart transversely of the highway by the width of a lane and provided with yellow and white materials, respectively.

Figure 2:
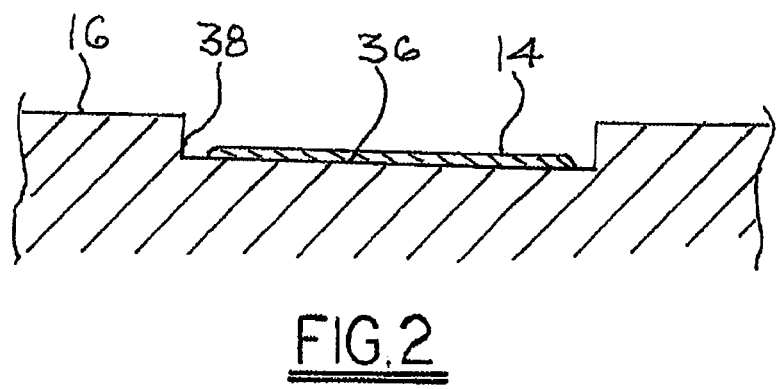
FIG. 2 is an elevational cross-sectional view taken along line 2-2 in FIG. 1.

Referring now to FIG. 2, in a currently preferred embodiment of the invention, marking 14 is applied as an inlay to a recessed region 36 of pavement 16. For pavement striping, region 36 preferably has a depth 38 of about 80 to 100 mils below the surface of pavement 16. For a stripe marking 6 inches wide, preferably a groove about 7 inches wide is cut in pavement 16, allowing a slight amount of control weave in laying down the marking. Region 36 may be cut by conventional grinding means such as a grinding wheel or a gang of wheels provided with tungsten carbide cutting stars, either dry or with water cooling. In either case, the groove must be clean and dry before application of the epoxy resin. A currently preferred cutting speed in asphalt pavement is about 1 mile per hour, thus requiring a cutting pass separate from and ahead of the higher-speed striping pass.

Preferably, high reflectivity ceramic particles 26 are formed of material having a relatively high index of refraction, at least 2.30 and preferably about 2.50. Such particles formed of a microcrystalline ceramic are available from 3M Corp, St. Paul, Minn. USA. Preferably, glass beads 30, 34 have an index of refraction between about 1.55 and about 1.95.

From the foregoing description, it will be apparent that there has been provided an improved pavement marking method and apparatus. Variations and modifications of the herein described method and apparatus, in accordance with the invention, will undoubtedly suggest themselves to those skilled in this art. Accordingly, the foregoing description should be taken as illustrative and not in a limiting sense.

What is claimed is:

1. A retroreflective area on a pavement, comprising: a) an epoxy binder adherent to said pavement; b) a plurality of high-reflectivity microcrystalline ceramic particles bonded to said epoxy binder; c) a plurality of coarse sieve-size glass beads bonded to said epoxy binder; and d) a plurality of fine sieve-size glass beads bonded to said epoxy binder, wherein said microcrystalline ceramic particles, said coarse sieve-size glass beads, and said fine sieve-size glass beads have been applied separately and sequentially to said epoxy binder at different times after deposition of said epoxy binder in liquid form on said pavement.

2. A retroreflective area in accordance with claim 1 wherein said area is in the form of a stripe.

3. A retroreflective area in accordance with claim 1 wherein said area is in the form of an indicium.

4. A retroreflective area in accordance with claim 1 wherein said area is disposed in a recessed region formed in said pavement.

5. A retroreflective area in accordance with claim 1 wherein said ceramic particles are present in a ratio of about 7 pounds of particles per gallon of said epoxy binder when still non-cured.

6. A retroreflective area in accordance with claim 1 wherein said coarse sieve-size glass beads are present in a ratio of about 7 pounds of beads per gallon of said epoxy binder when still non-cured.

7. A retroreflective area in accordance with claim 1 wherein said fine sieve-size glass beads are present in a ratio of about 10 pounds of beads per gallon of said epoxy binder when still non-cured.

* * * * *